(12) United States Patent
Chen

(10) Patent No.: US 11,385,791 B2
(45) Date of Patent: Jul. 12, 2022

(54) METHOD AND DEVICE FOR SETTING LAYOUT OF ICON OF SYSTEM INTERFACE OF MOBILE TERMINAL, AND MEDIUM

(71) Applicant: GREE ELECTRIC APPLIANCES, INC. OF ZHUHAI, Zhuhai (CN)

(72) Inventor: Junan Chen, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 17/122,143

(22) Filed: Dec. 15, 2020

(65) Prior Publication Data

US 2021/0096744 A1 Apr. 1, 2021

Related U.S. Application Data

(63) Continuation of application No. PCT/CN2018/121583, filed on Dec. 17, 2018.

(30) Foreign Application Priority Data

Jul. 4, 2018 (CN) .......................... 201810726713.4

(51) Int. Cl.
*G06F 3/04886* (2022.01)
*G06F 3/04817* (2022.01)
*G06F 3/04847* (2022.01)

(52) U.S. Cl.
CPC ...... *G06F 3/04886* (2013.01); *G06F 3/04817* (2013.01); *G06F 3/04847* (2013.01); *G06F 2203/04803* (2013.01)

(58) Field of Classification Search
CPC ............ G06F 3/04886; G06F 3/04817; G06F 3/04847; G06F 2203/04803;
(Continued)

(56) References Cited

U.S. PATENT DOCUMENTS 9,715,307 B1 * 7/2017 Barsness ............... G06F 3/0418
9,766,800 B2 * 9/2017 Chiba ................... G06F 3/0485
(Continued)

FOREIGN PATENT DOCUMENTS

CN 103309611 A 9/2013
CN 103530049 A 1/2014
(Continued)

OTHER PUBLICATIONS

International Search Report in corresponding PCT Application No. PCT/CN2018/121583, dated Apr. 4, 2019.
(Continued)

*Primary Examiner* — Justin R. Blaufeld
*Assistant Examiner* — Kenny Nguyen
(74) *Attorney, Agent, or Firm* — Westbridge IP LLC

(57) ABSTRACT

A method for setting a system interface of a mobile terminal includes: determining a pressure value; dividing sub-regions; determining a reduced or enlarged ratio of an icon; determining a layout of the icon; and determining a value of an operating parameter. Thus, the sub-regions may be divided targetedly according to characteristics of the sliding operation of each user, so that an icon position laid out for each system interface, according to the divided sub-regions, may be more adaptive to operation requirements of the user and may targetedly reduce operation difficulty of the user.

15 Claims, 5 Drawing Sheets

(58) Field of Classification Search
CPC ......... G06F 2203/04806; G06F 3/0416; G06F 3/0418; G06F 2203/04105; G06F 3/04883; G06F 3/0488
See application file for complete search history.

(56) References Cited

U.S. PATENT DOCUMENTS

| | | | |
|---|---|---|---|
| 9,958,979 B1* | 5/2018 | Barsness | H04L 67/42 |
| 10,394,365 B2* | 8/2019 | Barsness | G06F 3/0488 |
| 2012/0032979 A1* | 2/2012 | Blow | G06F 3/04817 345/647 |
| 2012/0052920 A1* | 3/2012 | Kobayashi | H04M 1/724 455/566 |
| 2013/0188081 A1 | 7/2013 | Kulas | |
| 2014/0028606 A1* | 1/2014 | Giannetta | G06F 3/04886 345/174 |
| 2014/0098036 A1 | 4/2014 | Paek et al. | |
| 2014/0204063 A1* | 7/2014 | Kaida | G06F 3/0393 345/184 |
| 2014/0247222 A1* | 9/2014 | Ferren | G06F 3/02 345/168 |
| 2015/0015506 A1* | 1/2015 | Lares | G06F 3/04886 345/173 |
| 2015/0234581 A1* | 8/2015 | Terrero | G06F 3/04886 715/863 |
| 2015/0253955 A1* | 9/2015 | Chiba | G06F 3/041 345/173 |
| 2016/0132139 A1* | 5/2016 | Du | G06F 3/0488 345/173 |
| 2017/0013115 A1 | 1/2017 | Kong et al. | |
| 2017/0068427 A1* | 3/2017 | Yamada | G06F 3/04886 |
| 2017/0300205 A1* | 10/2017 | Villa | G06F 3/04886 |
| 2018/0121001 A1* | 5/2018 | Barsness | H04L 67/306 |
| 2018/0157365 A1* | 6/2018 | Barsness | G06F 3/0488 |
| 2018/0329605 A1* | 11/2018 | Venkateswararao | G06F 3/0482 |
| 2020/0218441 A1* | 7/2020 | Murakami | G06F 3/04845 |

FOREIGN PATENT DOCUMENTS

| | | |
|---|---|---|
| CN | 104125332 A | 10/2014 |
| CN | 104571918 A | 4/2015 |
| CN | 104850341 A | 8/2015 |
| CN | 105468272 A | 4/2016 |
| CN | 105630371 A | 6/2016 |
| CN | 105677173 A | 6/2016 |
| CN | 106445431 A | 2/2017 |
| CN | 106557222 A | 4/2017 |
| CN | 107145294 A | 9/2017 |
| CN | 107577414 A | 1/2018 |
| JP | 2008113148 A | 5/2008 |
| KR | 20140068426 A | 6/2014 |

OTHER PUBLICATIONS

Written Opinion in corresponding PCT Application No. PCT/CN2018/121583, dated Apr. 4, 2019.
Extended European Search Report issued in counterpart European Patent Application No. 18925302.4, dated Jul. 12, 2021.
First Office Action issued in counterpart Japanese Patent Application No. 2020-568534, dated Feb. 1, 2022.
First Office Action issued in counterpart Korean Patent Application No. 10-2020-7035085, dated Jan. 26, 2022.
Office Action issued in counterpart European Patent Application No. 18925302.4, dated Apr. 21, 2022.

* cited by examiner

METHOD AND DEVICE FOR SETTING LAYOUT OF ICON OF SYSTEM INTERFACE OF MOBILE TERMINAL, AND MEDIUM

CROSS-REFERENCE TO RELATED APPLICATIONS

This application is a continuation of International Application No. PCT/CN2018/121583 filed on Dec. 17, 2018, which claims priority to Chinese patent application No. 201810726713.4 filed on Jul. 4, 2018. Both applications are incorporated herein by reference in their entireties.

TECHNICAL FIELD

The present application relates to a technical field of a mobile terminal, in particular to a method and a device for setting a system interface of a mobile terminal, and a medium.

BACKGROUND

At present, a touch screen is used on most of mobile phones, tablet computers and other mobile terminals. As the increases of a size of the touch screen, the difficulty of a single-hand operation is also increased under the existing system interface.

SUMMARY

Embodiments of the present application provide a method, an apparatus and a device for setting a system interface of a mobile terminal, and a medium, so as to solve problems that it is unable to effectively reduce the difficulty of a single-hand operation for different users.

The present application provides a method for setting a system interface of a mobile terminal, including:

determining a pressure value generated by a sliding operation at each pixel position on a mobile terminal screen, wherein the sliding operation includes at least one sliding operation performed on the mobile terminal screen in a single-hand operation mode, for each appointed position and according to each appointed direction which corresponds to the appointed position;

dividing a region of the mobile terminal screen into at least two sub-regions according to the pressure value at each pixel position, wherein each of the at least two sub-regions corresponds to a pressure value range; and determining a layout of an icon of each system interface according to a position of each divided sub-region on the screen.

According to the solutions provided by the present application, for each user, the pressure value generated at each pixel position on the mobile terminal screen may be determined after performing the sliding operation in the single-hand operation mode, the sub-regions may be divided according to the pressure value of each pixel position, and thereby, for each system interface, the layout of the icon may be determined according to the position of each divided sub-region. Thus, the sub-regions may be divided targetedly according to characteristics of the sliding operation of each user, so that an icon position laid out for each system interface, according to the divided sub-regions, may be more adaptive to operation requirements of the user and may targetedly reduce operation difficulty of the user.

In addition, the method further includes:

determining a reduced or enlarged ratio of the icon on each system interface according to an area of each divided sub-region; and the determining a layout of an icon of each system interface according to a position of each divided sub-region on the screen, includes:

determining a layout of a reduced or enlarged icon on each system interface according to the position of each divided sub-region on the screen.

Before laying out the icon, the reduced or enlarged ratio of the icon may be further determined for each system interface according to the area of each divided sub-region, and thereby the reduced or enlarged icon may be laid out. By reducing a size of the icon, the icon may be laid out at a sub-region with a highest operation comfort level as far as possible, which improves the convenience of an operation. By enlarging a size of the icon, a bigger icon may be displayed on the system interface, which is capable of improving the convenience of the operation and reducing the operation difficulty.

Further, when at least two sliding operations pass a same pixel position, a pressure value on the pixel position generated by the sliding operation is determined as an average of pressure values generated by the at least two sliding operations at the pixel position.

In the solutions according to the present application, if there are at least two sliding operations performed at a same pixel position, the average of the pressure values generated by the at least two sliding operations at the pixel position may be taken as the pressure value at the pixel position, which makes the obtained pressure value more accurate, and thereby makes a division of the sub-regions more accurate.

Further, the method further includes: determining a value corresponding to at least one operating parameter for each divided sub-region, and the operating parameter is a parameter for identifying a screen operation.

In the solutions according to the present application, values of different operating parameters may be determined for sub-regions with different operation comfort levels, so that even in a sub-region with a lower operation comfort level, the operation may also be successfully implemented, which ensures the convenience and accuracy of the operation.

Further, the at least one operating parameter includes at least one of the followings: a hot region for triggering an icon, a click control region for a control on a framework of the system interface, a hot region for triggering a slide, and a magnitude of force for triggering a slide;

the hot region for triggering an icon is a region for triggering the icon by clicking; the click control region for a control is a region for implementing control on the control by clicking; the hot region for triggering a slide is a minimum area for identifying the slide; and the magnitude of force for triggering a slide is a minimum pressure for identifying a slide.

In the solutions according to the present application, in order to ensure the icon is triggered accurately, the control on the framework of the system interface is controlled accurately and the sliding operation is implemented successfully, values of the hot region for triggering an icon, the click control region for a control on a framework of the system interface, the hot region for triggering a slide and the magnitude of force for triggering a slide in each sub-region may be determined.

The present application also provides a non-transitory computer storage medium, the computer storage medium stores an executable program, and the executable program is performed by a processor to implement the steps in the above method.

The present application also provides a device for setting a system interface of a mobile terminal, including a memory, a processor, and a computer program stored on the memory, and the computer program is performed by the processor, the steps in the above method are implemented.

BRIEF DESCRIPTION OF DRAWINGS

In order to describe the technical solutions in the embodiments of the present application more clearly, a brief introduction on the drawings needed in the description of the embodiments is given below. Obviously, the drawings in the description below are only some embodiments of the present application, based on which other drawings may also be obtained by those of ordinary skill in the art without any inventive efforts. In the drawings:

FIG. 4 (*b*) is a schematic diagram of a layout of an icon according to embodiment 1 of the present application;

DETAILED DESCRIPTION OF THE EMBODIMENTS

In order to make the purposes, technical solutions and advantages of the present application clearer, the specific embodiments of the present application will be further described below in detail in combination with the drawings. Apparently, the described embodiments are only a part, but not all, of the embodiments of the present application. All of the other embodiments that are obtained by those of ordinary skill in the art based on the embodiments in the present application without any inventive efforts fall into the scope protected by the present application.

It should be noted that the terms "including" and "comprising" and any of their variations in the description and claims and the drawings of the present application are intended to cover non-exclusive inclusions, for example, a process, method, system, product, or device that includes a series of steps or units need not be limited to those explicitly listed, instead it may include other steps or units not explicitly listed or inherent to this process, method, product or device.

When a mobile terminal is held by a user in single-hand, due to the influence of individual differences between users, such as a size of a hand, a grip position or other factors, a system interface interaction between the user and a screen of the mobile terminal varies from person to person, and the difficulty of the single-hand operation for each user is also not exactly the same. However, at present, there is no method that reduces the difficulty of the single-hand operation for the differences between the users.

Embodiment 1

Figure 1:
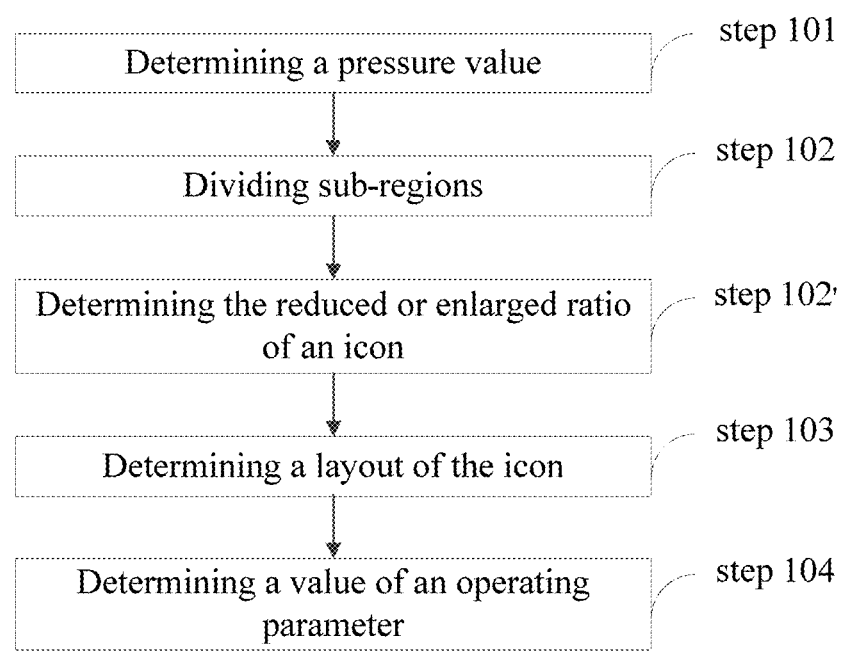
FIG. 1 is a flowchart of a method for setting a system interface of a mobile terminal according to embodiment 1 of the present application.

The embodiment 1 of the present application provides a method for setting a system interface of a mobile terminal. A flowchart of steps of the method, as shown in FIG. 1, includes the following steps.

In step 101, a pressure value is determined.

In general, the more a region is suitable for performing an operation, the greater the pressure value generated when a user performs a sliding operation is, due to the convenience of the operation. Therefore, in the embodiment, an operation comfort level is represented by the pressure value generated when the sliding operation is performed. It may be appreciated that the higher the pressure value is, the higher the operation comfort level is.

In this step, the pressure value generated by the sliding operation at each pixel position on a mobile terminal screen may be determined, and the sliding operation includes at least one sliding operation performed on the mobile terminal screen in a single-hand operation mode, for each appointed position and according to each appointed direction which corresponds to the appointed position.

Specifically, the user may be instructed to perform the at least one sliding operation from each appointed position in each appointed direction corresponding to each appointed position on the mobile terminal screen in the single-hand operation mode. By setting the appointed position and a corresponding appointed direction, the sliding operation of the user may be performed on an entire mobile terminal screen as much as possible, and thus the pressure value at each pixel position may be determined when the sliding operation is performed on the mobile terminal screen.

The setting for each appointed position, and for each appointed direction corresponding to each appointed position, may be arbitrary. Preferably, in order to ensure that a user may perform a sliding operation at each pixel position while trying to reduce the number of sliding operations of the user, the schematic diagram of the appointed position and its corresponding appointed direction may be shown in FIG. 2, which includes eight appointed positions, and each appointed position corresponds to one appointed direction:

the appointed position being a midpoint of an upper edge of the screen, and its corresponding appointed direction being downward;

the appointed position being a midpoint on a bottom edge of the screen, and its corresponding appointed direction being upward;

the appointed position being a midpoint of a left edge of the screen, and its corresponding appointed direction being rightward;

the appointed position being a midpoint of a right edge of the screen, and its corresponding appointed direction being leftward;

the appointed position being an upper left corner of the screen, and its corresponding appointed direction being toward a lower right corner;

the appointed position being a lower left corner of the screen, and its corresponding appointed direction being toward an upper right corner;

the appointed position being an upper right corner of the screen, and its corresponding appointed direction being toward a lower left corner; and the appointed position being a lower right corner of the screen, and its corresponding appointed direction being toward an upper left corner.

Figure 2:
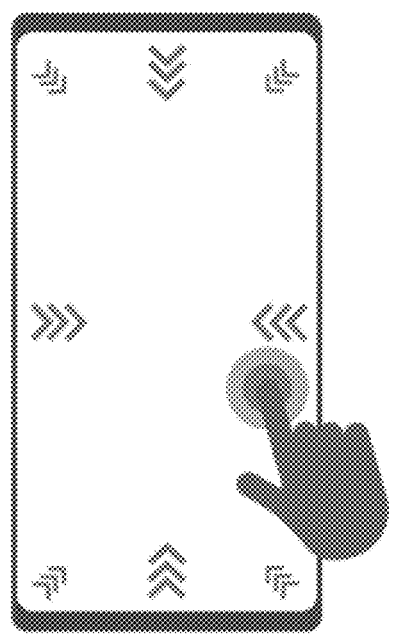
FIG. 2 is a schematic diagram of an appointed position and an appointed direction according to embodiment 1 of the present application.

When the schematic diagram of the appointed position and the appointed direction are shown in FIG. 2, it is required to respectively perform the at least one sliding operation for each appointed position in its corresponding appointed direction, that is, at least eight sliding operations shall be performed. Of course, one appointed position may also correspond to multiple appointed directions, which won't be repeated in the embodiment.

The sliding operation from one appointed position in one of its corresponding appointed directions may be performed once. Preferably, the sliding operation from one appointed position in one of its corresponding appointed directions may be performed at least twice, so as to further ensure a full coverage of the sliding operations on the mobile terminal screen.

If multiple sliding operations are performed from one appointed position in one of its corresponding appointed directions, an overlapping region of the multiple sliding operations may be generated. An average of the pressure values generated by the at least two sliding operations at one pixel position may be used as the pressure value at the pixel position, so as to make the obtained pressure value more accurate, thereby making a divided sub-region more accurate, and giving the operation comfort level a better representation.

Of course, even if the sliding operation is performed once from one appointed position in one of its corresponding appointed directions, multiple sliding operations from multiple appointed positions in their corresponding appointed directions may also generate the overlapping region. In this situation, the average of the pressure values generated by the multiple sliding operations at one pixel position may also be used as the pressure value at the pixel position.

Specifically, when the at least two sliding operations pass a same pixel position, the pressure value at the pixel position generated by the sliding operation is determined as the average of pressure values generated by the at least two sliding operations at the pixel position.

In step 102, sub-regions are divided.

In this step, a region of the mobile terminal screen may be divided into at least two sub-regions according to the pressure value at each pixel position, and each of the at least two sub-region corresponds to a pressure value range.

Figure 3:
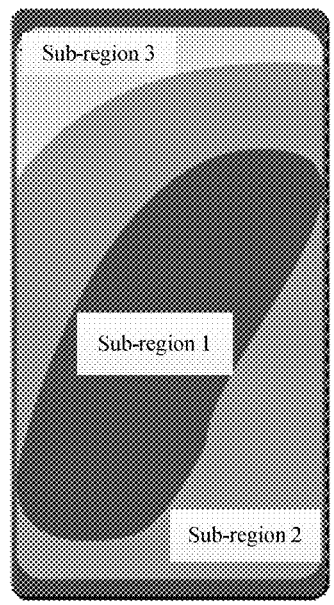
FIG. 3 is a schematic diagram of a sub-region division according to embodiment 1 of the present application.

For example, as shown in FIG. 3, pixels with pressure values greater than A1 at pixel positions thereof may be divided into one sub-region, marked as sub-region 1; pixels with pressure values greater than A2 and less than A1 thereof may be divided into one sub-region, marked as sub-region 2; and pixels with pressure values greater than A3 and less than A2 thereof may be divided into one sub-region, marked as sub-region 3. Thus, the screen region is divided into three sub-regions. It could be understood that the operation comfort level of the sub-region 1 is the highest, the operation comfort level of the sub-region 2 is the second, and the operation comfort level of the sub-region 3 is the lowest.

Due to the individual differences of the users, performances of the sliding operations are different, so that the sub-regions determined by each user may be different. And determined sub-regions may also be different after a same user performing sliding operations with the left hand and the right hand respectively. Therefore, in the solutions according to the embodiment, the individual differences of the users may be better met to determine differentiated sub-regions, which effectively reduces the difficulty of the single-hand operation. Meanwhile, as for a sliding operation performed by a same hand of a same user, if a size of the mobile terminal and/or a size of the screen is different, the sliding operation may be affected, so that the determined sub-regions may also be changed, and therefore operation requirements of the user may be well adapted and the convenience of the single-hand operation may be improved.

In step 103, a layout of an icon is determined.

In this step, the layout of the icon of each system interface may be determined according to a position of each divided sub-region on the screen.

Specifically, as for each system interface, the icon on the system interface of the mobile terminal may be laid out as far as possible in a sub-region with the highest operation comfort level. If an area of the sub-region with the highest operation comfort level is insufficient to lay out the icon, the icon may further be laid out in a sub-region with a second operation comfort level, and so on, until all the icons are laid out on the system interface.

Preferably, after the step 102 and before the step 103, a reduced or enlarged ratio of the icon may further be determined to meet layout requirements of the icon. Further, step 102' may be included in the embodiment.

In step 102', a reduced or enlarged ratio of the icon is determined.

In this step, the reduced or enlarged ratio of the icon on each system interface may be determined according to an area of each divided sub-region.

For example, on one system interface, if there are larger quantity of icons need to be displayed, a reduced ratio of the icons may be determined in order to lay out the icons in a sub-region with a higher operation comfort level (whose area may be a sum of areas of many sub-regions with higher operation comfort levels, for example, the sum of the areas of a sub-region with the highest operation comfort level and a sub-region with a second highest operation comfort level) as much as possible. For another example, on another system interface, if there are smaller quantity of icons need to be displayed, an enlarged ratio of the icons may be determined. By displaying larger icons, the convenience of the operation may be improved much more.

Figure 4:
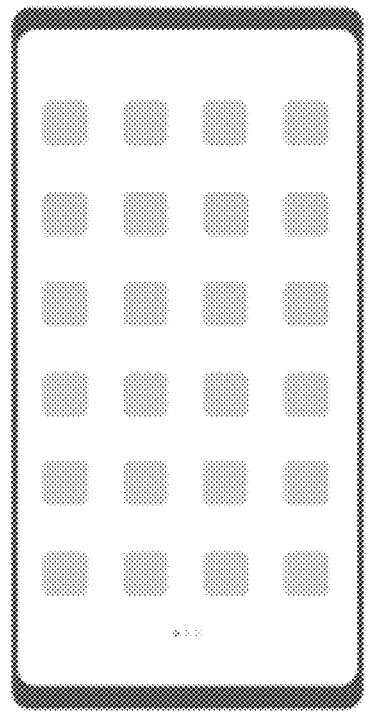
FIG. 4 (*a*) is a schematic diagram of a layout of an icon according to a system default interface.
Figure 4:
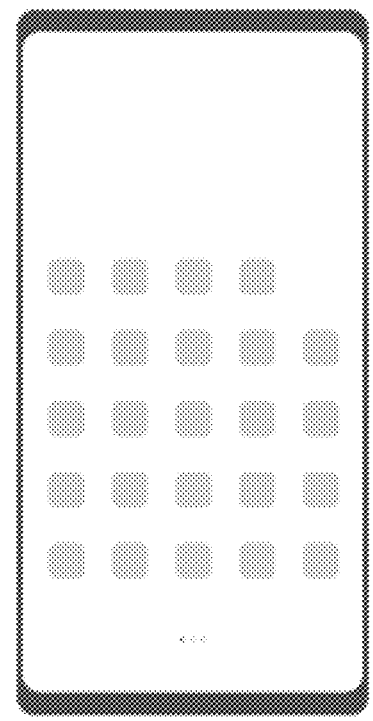

FIG. 4(*a*) is a schematic diagram of a layout of an icon according to a system default interface, and FIG. 4(*b*) is a schematic diagram of a layout of an icon on a system interface after icons are reduced according to the embodiment. Of course, the layout of icon on the system interface is not limited to that shown in FIG. 4 (*b*). The layout of the icon may also be changed in the case that distributions of at least two determined sub-regions with different operation comfort levels on the screen are different.

If the step 102' has been performed, the step 103 may include: determining a layout of a reduced or enlarged icon on each system interface according to the position of each divided sub-region on the screen.

Further, after the step 102, the embodiment may further include step 104. In FIG. 1, this step is executed after the step 103, which is an example. The step 104 is not limited to be executed after the step 103.

In step 104, a value of an operating parameter is determined.

In this step, a value corresponding to at least one operating parameter for each divided sub-region may be determined, and the operating parameter is a parameter for identifying a screen operation. Then different values of different operating parameters may be determined for sub-regions with different operation comfort levels, so that the operation may also be successfully implemented even in a sub-region with a lower comfort level, thereby ensuring the convenience and accuracy of the operation.

Specifically, the at least one operating parameter may include but not limited to at least one of: a hot region for triggering an icon, a click control region for a control on a framework of the system interface, a hot region for triggering a slide, and a magnitude of force for triggering a slide.

The hot region for triggering an icon is a region for triggering the icon by clicking; the click control region for a control is a region for implementing control on the control by clicking; the hot region for triggering a slide is a minimum area for identifying the slide; and the magnitude of force for triggering a slide is a minimum pressure for identifying the slide.

Preferably, values of the hot region for triggering an icon, the click control region for a control on a framework of the system interface, the hot region for triggering a slide, and the magnitude of force for triggering a slide in each sub-region may be determined to ensure the icon is triggered accurately, the control on the framework of the system interface is controlled accurately and an execution of the sliding operation is performed successfully.

Figure 5:
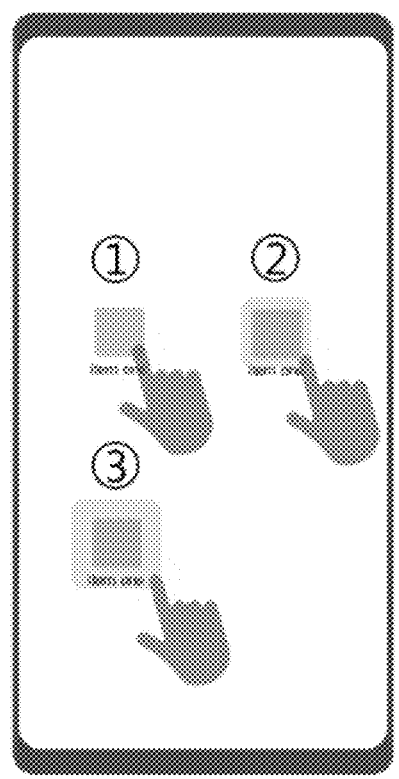
FIG. 5 is a schematic diagram of sizes of hot regions for triggering an icon for different sub-regions according to embodiment 1 of the present application.

The determining a value of the hot region for triggering an icon for each sub-region may be explained below, as an example. FIG. 5 is a schematic diagram of values of the hot regions for triggering an icon respectively determined for the sub-region 1, the sub-region 2 and the sub-region 3 shown in FIG. 3. A determined size of the hot region for triggering an icon corresponding to the sub-region 1 may be the size of the icon shown in ① (In FIG. 5, the values of the hot regions for triggering an icon corresponding to three sub-regions are illustrated by taking the icons named item one as an example), a size of the hot region for triggering an icon corresponding to the sub-region 2 may be the size of the icon shown in ② (an area of a hot region for triggering an icon corresponding to the sub-region 2 is greater than that of the icon, for example, assuming that the icon is a square, a side length of the hot region for triggering an icon corresponding to the sub-region 2 may be 1 mm longer than that of the icon), a size of the hot region for triggering an icon corresponding to the sub-region 3 may be the size of the icon shown in ③ (an area of a hot region for triggering an icon corresponding to the sub-region 3 increases further, a side length of the hot region for triggering an icon corresponding to the sub-region 3 is 2 mm longer than that of the icon). As shown in FIG. 5, an area of the hot region for triggering an icon gradually increases with the decrease of the operation comfort level, so that the icon triggering may be realized easily for the sub-region with the lower operation comfort level through a hot region for triggering an icon with a larger area.

It should be noted that, after the execution of the step 103 or the step 104, the determined layout of the icon and the values of the operating parameters may be directly applied to a setting of the default system interface of the mobile terminal, and an interface corresponding to an updated setting of the system interface may be displayed. The determined layout of the icon and the values of the operating parameters may also be saved, or the updated setting of the system interface may be saved, so as to realize a display of a new system interface later.

Of course, after the interface corresponding to the updated setting of the system interface is displayed, the determined layout of the icon and the values of the operating parameters may also be saved or the updated setting of the system interface may be saved, so that, after an exit of the system interface applying the determined layout of the icon and the values of the operating parameters, the user may enter it again.

If the determined layout of the icon and the values of the operating parameters are saved, when there is a need to enter the interface applying the determined layout of the icon and the values of the operating parameters, the default system interface may automatically apply the determined layout of the icon and the values of the operating parameters to generate a new setting of the system interface and realize the display of a new system interface. If the updated setting of the system interface is saved, the display of the new system interface may be implemented directly according to the updated setting of the system interface.

The execution of the steps 101 to 104 may be triggered in any way at any time when the mobile terminal is turned on. For example, the steps 101 to 104 may be, but not limited to, automatically executed during an initial startup of a new mobile terminal. Namely, in a guided interface of the new mobile terminal, an individual customized setting of an interactive interface for a user to choose may be determined according to a guided sliding operation and through a system calculation. A user may choose to apply the determined layout of the icon and the values of the operating parameters directly, and after it is applied, the default system interface may automatically adapt the determined layout of the icon and the values of the operating parameters, so as to realize the display of the new system interface.

A user may exit the interface applying the determined layout of the icon and the values of the operating parameters in any way. For example, it may be, but not limited to, implemented in the following way: by displaying a prompt message in a notification bar of the mobile terminal, the default system interface may be returned with one key when the prompt message is closed.

Of course, the interface applying the determined layout of the icon and the values of the operating parameters may also be re-entered, which may be triggered in any way. For example, the prompt message may also be displayed after the default system interface is returned, the interface applying the determined layout of the icon and the values of the operating parameters may be re-entered by clicking the prompt message.

Based on a same inventive concept as the embodiment 1, a following apparatus is provided.

Embodiment 2

Figure 6:
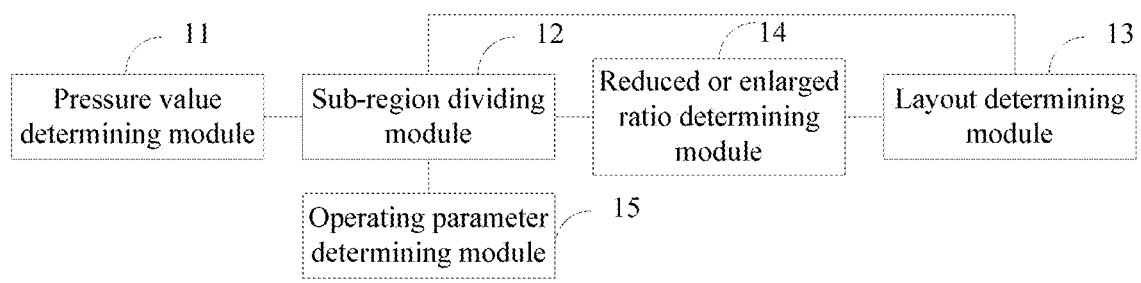
FIG. 6 is a schematic structural diagram of an apparatus for setting a system interface of a mobile terminal according to embodiment 2 of the present application.

The embodiment 2 of the present application provides an apparatus for setting a system interface of a mobile terminal, a structure of the apparatus may be shown as FIG. 6, including:

a pressure value determining module 11, configured to determine a pressure value generated by a sliding operation at each pixel position on a mobile terminal screen, wherein the sliding operation includes at least one sliding operation performed on the mobile terminal screen in a single-hand operation mode, for each appointed position and according to each appointed direction which corresponds to the appointed position;

a sub-region dividing module 12, configured to divide a region of the mobile terminal screen into at least two sub-regions according to the pressure value at each pixel position, wherein each of the at least sub-regions corresponds to a pressure value range; and a layout determining module 13, configured to determine a layout of an icon of each system interface according to a position of each divided sub-region on the screen.

The apparatus also includes a reduced or enlarged ratio determining module 14, configured to determine a reduced or enlarged ratio of the icon on each system interface according to an area of each divided sub-region.

The layout determining module 13 is specifically configured to determine a layout of a reduced or enlarged icon on each system interface according to a position of the each divided sub-region on the screen.

The pressure value determining module 11 is configured to determine a pressure value on the pixel position generated by the sliding operation, when at least two sliding operations pass a same pixel position, as an average of pressure values generated by the at least two sliding operations at the pixel position.

The apparatus also includes an operating parameter determining module 15, configured to determine a value corresponding to at least one operating parameter for each divided sub-region, wherein the operating parameter is a parameter for identifying a screen operation.

Based on the same inventive concept, the embodiments of the present application provide a following device and medium.

Embodiment 3

Figure 7:
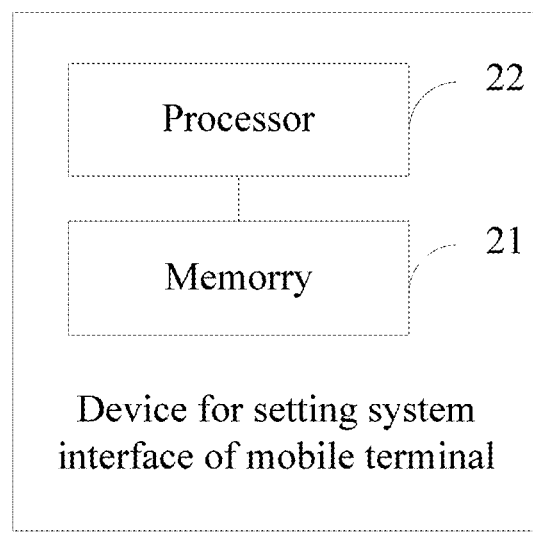
FIG. 7 is a schematic structural diagram of a device for setting a system interface of a mobile terminal according to embodiment 3 of the present application.

The embodiment 3 of the present application provides a device for setting a system interface of a mobile terminal, a structure of the device may be shown as FIG. 7, including: a memory 21, a processor 22 and a computer program stored on the memory. When the computer program is performed by the processor 22, the steps in the method described in the embodiment 1 of the present application are implemented.

Optionally, the processor 22 may specifically include Central Processing Unit (CPU), Application Specific Integrated Circuit (ASIC), and the processor 22 may be one or more integrated circuits for controlling program execution, a hardware circuit developed using Field Programmable Gate Arrays (FPGA), or a baseband processor.

Optionally, the processor 22 may include at least one processing core.

Optionally, the memory 21 may include a Read Only Memory (ROM), a Random Access Memory (RAM) and a disk storage. The memory 21 is used to store data required for the operation of at least one processor 22. The number of memories may be one or more.

The embodiment 4 of the present application provides a non-transitory computer storage medium, the computer storage medium stores an executable program, and the executable program is performed by a processor to implement the steps in the method described in the embodiment 1 of the present application.

In the specific implementation process, the computer storage medium may include: Universal Serial Bus (USB) flash drive, removable hard disk, Read Only Memory (ROM), Random Access Memory (RAM), magnetic disk or optical disk and other storage medium that may store program codes.

It should be understood that the apparatus and method in the embodiments of the present application may be implemented in other ways. For example, the embodiments of the apparatus described above are only schematic, for example, the units or the division of the units are just the division of logical functions, there may be other ways to divide the units in actual implementation, such as multiple units or components may be combined or integrated into another system, or some features may be ignored or not performed. On the other hand, a coupling or a direct coupling or a communication connection shown or discussed between each other may be an indirect coupling or a communication connection through some interfaces, devices or units, or in the form of electricity or in other forms.

Each functional unit in the embodiments of the present application may be integrated in a processing unit, or each unit may be a separate physical module.

The integrated element may be stored in a computer-readable storage medium if being achieved in the form of a software function element and sold or used as a standalone product. Based on such understanding, all or part of the technical solutions in the embodiments of the present application may be embodied in the form of a software product that is stored in a storage medium, including multiple instructions used to cause a computer device, such as a personal computer, a server, or a network device, a processor and the like, to implement all or part of the steps of the method described in various embodiments of the present application. The abovementioned storage medium includes: various medium capable of storing a program code, such as a universal serial bus flash drive, a Read Only Memory (ROM), a Random Access Memory (RAM), a mobile hard disk, a magnetic disk or an optical disc.

Those skilled in the art should understand that, in the embodiments of the present application, a method, a system or a computer program product may be provided. Thus, forms of hardware embodiments, full software embodiments or embodiments integrating software and hardware may be adopted in the present application. Moreover, a form of the computer program product implemented on at least one computer available storage media (including, but not limited to, a disk memory, a Compact Disc Read-Only Memory (CD-ROM), an optical memory and the like) containing computer available program codes may be adopted in the present application.

The present application is described with reference to flowcharts and/or block diagrams of the method, the device (system) and the computer program product according to the embodiments of the present application. It should be understood that each flow and/or block in the flowcharts and/or the block diagrams and a combination of the flows and/or the blocks in the flowcharts and/or the block diagrams may be realized by computer program instructions. These computer program instructions may be provided for a general computer, a dedicated computer, an embedded processor or processors of other programmable data processing devices to generate a machine, so that an apparatus for realizing functions assigned in at least one flow of the flowcharts and/or at least one block of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in at least one flow of the flowcharts and/or at least one block of the block diagrams.

These computer program instructions may also be loaded to the computers or the other programmable data processing devices, so that processing realized by the computers is generated by executing a series of operation steps on the computers or the other programmable devices, and therefore the instructions executed on the computers or the other programmable devices provide steps of realizing the functions assigned in at least one flow of the flowcharts and/or at least one block of the block diagrams.

While some embodiments of the present application have been described, those skilled in the art may make additional changes and modifications to the embodiments once knowing a basic creativity concept. Therefore, the appended claims are intended to be interpreted as including some preferred embodiments and all the changes and modifications falling within the scope of the present application.

It is apparent that those skilled in the art may make various modifications and variations to the present application without departing from the spirit and scope of the present application. Thus, if such modifications and variations of the present application fall within the scope of the appended claims and their equivalents, the present application is also intended to cover the modifications and variations.

What is claimed is:

1. A method for setting a system interface of a mobile terminal, the method being executed by the mobile terminal, the method comprising:
    determining a pressure value generated by at least two sliding operations at each pixel position on a mobile terminal screen, wherein the at least two sliding operations are performed on the mobile terminal screen in a single-hand operation mode, for each appointed position and according to each appointed direction which corresponds to the appointed position, wherein when the at least two sliding operations pass a same pixel position, the pressure value on the pixel position generated by the at least two sliding operations is determined as an average of pressure values generated by the at least two sliding operations at the pixel position;
    dividing a region of the mobile terminal screen into at least two sub-regions with different operation comfort levels according to the pressure value at each pixel position, wherein an operation comfort level is represented by the pressure value generated when the at least two sliding operations are performed on the mobile terminal screen, and the higher the pressure value is, the higher the operation comfort level is; and
    determining a layout of an icon for each icon in a plurality of icons on the system interface of the mobile terminal according to a position of each divided sub-region on the mobile terminal screen, wherein the icon on the system interface of the mobile terminal is preferentially laid out in a sub-region with a highest operation comfort level in the at least two sub-regions,
    wherein if an area of the sub-region with the highest operation comfort level is insufficient to lay out the icon, the icon is further laid out in a sub-region with a second highest operation comfort level, and so on, until all the plurality of icons are laid out on the system interface.

2. The method of claim 1, further comprising:
    determining a reduced or enlarged ratio of the icon on each system interface according to an area of each divided sub-region;
    wherein the determining a layout of an icon for each icon in a plurality of icons on the system interface of the mobile terminal according to a position of each divided sub-region on the mobile terminal screen, comprises:
    determining a layout of a reduced or enlarged icon on each system interface according to the position of each divided sub-region on the mobile terminal screen.

3. The method of claim 1, further comprising:
    determining a value corresponding to at least one operating parameter for each divided sub-region, wherein the at least one operating parameter is a parameter for identifying a screen operation.

4. The method of claim 3, wherein the at least one operating parameter comprises at least one of the followings: a hot region for triggering an icon, a click control region for a control on a framework of the system interface, a hot region for triggering a slide, and a magnitude of force for triggering a slide;
    wherein the hot region for triggering an icon is a region for triggering the icon by clicking; the click control region for a control is a region for implementing control on the control by clicking; the hot region for triggering a slide is a minimum area for identifying the slide; and the magnitude of force for triggering a slide is a minimum pressure for identifying the slide.

5. The method of claim 4, wherein an area of the hot region for triggering an icon is larger than that of the icon.

6. A non-transitory computer storage medium, wherein the computer storage medium stores an executable program, the executable program is performed by a processor of a mobile terminal to implement the following steps:
    determining a pressure value generated by at least two sliding operations at each pixel position on a mobile terminal screen, wherein the at least two sliding operations are performed on the mobile terminal screen in a single-hand operation mode, for each appointed position and according to each appointed direction which corresponds to the appointed position, wherein when the at least two sliding operations pass a same pixel position, the pressure value on the pixel position generated by the at least two sliding operations is determined as an average of pressure values generated by the at least two sliding operations at the pixel position;
    dividing a region of the mobile terminal screen into at least two sub-regions with different operation comfort levels according to the pressure value at each pixel position, wherein an operation comfort level is represented by the pressure value generated when the at least two sliding operations are performed on the mobile terminal screen, and the higher the pressure value is, the higher the operation comfort level is; and
    determining a layout of an icon for each icon in a plurality of icons on the system interface of the mobile terminal according to a position of each divided sub-region on the mobile terminal screen, wherein the icon on the system interface of the mobile terminal is preferentially laid out in a sub-region with a highest operation comfort level in the at least two sub-regions,
    wherein if an area of the sub-region with the highest operation comfort level is insufficient to lay out the icon, the icon is further laid out in a sub-region with a second highest operation comfort level, and so on, until all the plurality of icons are laid out on the system interface.

7. The non-transitory computer storage medium of claim 6, wherein the processor further implements the following step:
    determining a reduced or enlarged ratio of the icon on each system interface according to an area of each divided sub-region;

wherein the determining a layout of an icon for each icon in a plurality of icons on the system interface of the mobile terminal according to a position of each divided sub-region on the mobile terminal screen, comprises:

determining a layout of a reduced or enlarged icon on each system interface according to the position of each divided sub-region on the mobile terminal screen.

8. The non-transitory computer storage medium of claim 6, the processor further implements the following step:

determining a value corresponding to at least one operating parameter for each divided sub-region, wherein the at least one operating parameter is a parameter for identifying a screen operation.

9. The non-transitory computer storage medium of claim 8, wherein the at least one operating parameter comprises at least one of the followings: a hot region for triggering an icon, a click control region for a control on a framework of the system interface, a hot region for triggering a slide, and a magnitude of force for triggering a slide;

wherein the hot region for triggering an icon is a region for triggering the icon by clicking; the click control region for a control is a region for implementing control on the control by clicking; the hot region for triggering a slide is a minimum area for identifying the slide; and the magnitude of force for triggering a slide is a minimum pressure for identifying the slide.

10. The non-transitory computer storage medium of claim 9, wherein an area of the hot region for triggering an icon is larger than that of the icon.

11. A device for setting a system interface of a mobile terminal, the device being the mobile terminal, the device comprising:

a memory;
a processor; and
a computer program stored on the memory;
wherein the computer program is performed by the processor to implement the following steps:

determining a pressure value generated by at least two sliding operations at each pixel position on a mobile terminal screen, wherein the at least two sliding operations are performed on the mobile terminal screen in a single-hand operation mode, for each appointed position and according to each appointed direction which corresponds to the appointed position, wherein when the at least two sliding operations pass a same pixel position, the pressure value on the pixel position generated by the at least two sliding operations is determined as an average of pressure values generated by the at least two sliding operations at the pixel position;

dividing a region of the mobile terminal screen into at least two sub-regions with different operation comfort levels according to the pressure value at each pixel position, wherein an operation comfort level is represented by the pressure value generated when the at least two sliding operations are performed on the mobile terminal screen, and the higher the pressure value is, the higher the operation comfort level is; and determining a layout of an icon for each icon in a plurality of icons of each on the system interface of the mobile terminal according to a position of each divided sub-region on the mobile terminal screen, wherein the icon on the system interface of the mobile terminal is preferentially laid out in a sub-region with a highest operation comfort level in the at least two sub-regions, wherein if an area of the sub-region with the highest operation comfort level is insufficient to lay out the icon, the icon is further laid out in a sub-region with a second highest operation comfort level, and so on, until all the plurality of icons are laid out on the system interface.

12. The device of claim 11, the processor further implements the following step:

determining a reduced or enlarged ratio of the icon on each system interface according to an area of each divided sub-region;

wherein the determining a layout of an icon for each icon in a plurality of icons on the system interface of the mobile terminal according to a position of each divided sub-region on the mobile terminal screen, comprises:

determining a layout of a reduced or enlarged icon on each system interface according to the position of each divided sub-region on the mobile terminal screen.

13. The device of claim 11, the processor further implements the following step:

determining a value corresponding to at least one operating parameter for each divided sub-region, wherein the at least one operating parameter is a parameter for identifying a screen operation.

14. The device of claim 13, wherein the at least one operating parameter comprises at least one of the followings: a hot region for triggering an icon, a click control region for a control on a framework of the system interface, a hot region for triggering a slide, and a magnitude of force for triggering a slide;

wherein the hot region for triggering an icon is a region for triggering the icon by clicking; the click control region for a control is a region for implementing control on the control by clicking; the hot region for triggering a slide is a minimum area for identifying the slide; and the magnitude of force for triggering a slide is a minimum pressure for identifying the slide.

15. The device of claim 14, wherein an area of the hot region for triggering an icon is larger than that of the icon.

* * * * *